US010671508B2

(12) United States Patent
Gopu et al.

(10) Patent No.: US 10,671,508 B2
(45) Date of Patent: Jun. 2, 2020

(54) TESTING A CLOUD SERVICE (71) Applicant: HEWLETT PACKARD ENTERPRISE DEVELOPMENT LP, Houston, TX (US)

(72) Inventors: Upendra Gopu, Bangalore (IN); Anusha Kadambala, Bangalore (IN); Siva Subramaniam Manickam, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 151 days.

(21) Appl. No.: 15/500,005

(22) PCT Filed: Nov. 19, 2014

(86) PCT No.: PCT/US2014/066392
§ 371 (c)(1),
(2) Date: Jan. 27, 2017

(87) PCT Pub. No.: WO2016/048394
PCT Pub. Date: Mar. 31, 2016

(65) Prior Publication Data
US 2017/0242774 A1    Aug. 24, 2017

(30) Foreign Application Priority Data
Sep. 25, 2014    (IN) .......................... 4706/CHE/2014

(51) Int. Cl.
*G06F 11/34*    (2006.01)
*G06F 11/36*    (2006.01)
(Continued)

(52) U.S. Cl.
CPC ...... *G06F 11/3433* (2013.01); *G06F 11/3006* (2013.01); *G06F 11/3409* (2013.01);
(Continued)

(58) Field of Classification Search
CPC ............. G06F 11/3006; G06F 11/3664; G06F 11/3409; G06F 11/3433; G06F 11/3688;
(Continued)

(56) References Cited

U.S. PATENT DOCUMENTS 6,182,246 B1    1/2001    Gregory et al.
6,243,832 B1    6/2001    Eckes et al.
(Continued)

FOREIGN PATENT DOCUMENTS

CN    103399496 A    11/2013
CN    104333488 A    2/2015
(Continued)

OTHER PUBLICATIONS

International Searching Authority, "Notification of Transmittal of the International Search Report and the Written Opinion", PCT/US2014/0669392, dated May 27, 2015, 9 pages.
(Continued)

*Primary Examiner* — Jungwon Chang
(74) *Attorney, Agent, or Firm* — Hewlett Packard Enterprise Patent Department (57) ABSTRACT

Some examples described herein relate to testing of a cloud service. In an example, a cloud service to be tested may be deployed in a cloud system. A test load may be applied to the cloud service. Upon application of the test load to the cloud service, a determination may be made whether a performance metric related to the cloud service meets a pre-configured criterion. If the performance metric related to the cloud service meets a pre-configured criterion, the cloud service may be scaled. Operations of applying, determining, and scaling may iterated until an end condition is met, wherein the test load applied to the cloud service may vary after each iteration operation.

19 Claims, 4 Drawing Sheets

(51) Int. Cl.
  *G06F 11/30* (2006.01)
  *H04L 12/24* (2006.01)
  *H04L 12/26* (2006.01)
  *H04L 29/08* (2006.01)

(52) U.S. Cl.
  CPC .......... *G06F 11/3688* (2013.01); *H04L 41/06* (2013.01); *H04L 41/50* (2013.01); *H04L 43/08* (2013.01); *H04L 67/10* (2013.01)

(58) Field of Classification Search
  CPC ........ G06F 11/3672; G06F 8/61; H04L 41/06; H04L 41/50; H04L 43/08; H04L 43/50; H04L 41/51; H04L 67/10; H04L 41/08; H04L 41/085
  USPC .......................................... 709/224; 717/124
  See application file for complete search history.

(56) References Cited

U.S. PATENT DOCUMENTS

| | | | |
|---|---|---|---|
| 9,069,599 | B2 | 6/2015 | Martinez et al. |
| 9,363,156 | B2 | 6/2016 | Chandrasekharapuram et al. |
| 9,396,160 | B1 | 7/2016 | Aithal et al. |
| 9,436,725 | B1 | 9/2016 | Aithal et al. |
| 9,444,717 | B1 | 9/2016 | Aithal et al. |
| 9,876,703 | B1 | 1/2018 | Arllen et al. |
| 10,009,292 | B2 | 6/2018 | Dunbar et al. |
| 2005/0166115 | A1 | 7/2005 | Daume et al. |
| 2009/0300423 | A1 | 12/2009 | Ferris |
| 2010/0198960 | A1 | 8/2010 | Kirschnick et al. |
| 2013/0019015 | A1 | 1/2013 | Devarakonda et al. |
| 2013/0054792 | A1 | 2/2013 | Sharaf |
| 2013/0067298 | A1* | 3/2013 | Li ................... G06F 11/3688 714/799 |
| 2013/0080999 | A1* | 3/2013 | Yang ................ G06F 11/3664 717/124 |
| 2014/0026122 | A1* | 1/2014 | Markande .......... G06F 11/3664 717/124 |
| 2014/0067679 | A1 | 3/2014 | O'Reilly et al. |
| 2015/0100684 | A1* | 4/2015 | Maes ................. G06F 11/3672 709/224 |
| 2015/0324182 | A1* | 11/2015 | Barros ...................... G06F 8/61 717/174 |
| 2016/0062880 | A1 | 3/2016 | Moretto et al. |
| 2016/0072730 | A1* | 3/2016 | Jubran ................... H04L 43/50 709/224 |
| 2016/0364307 | A1 | 12/2016 | Garg et al. |
| 2017/0212822 | A1 | 7/2017 | Idrisov et al. |
| 2017/0315902 | A1 | 11/2017 | Moretto et al. |
| 2019/0087301 | A1 | 3/2019 | M et al. |

FOREIGN PATENT DOCUMENTS

| | | |
|---|---|---|
| EP | 2704401 A1 | 3/2014 |
| WO | WO-2013184137 | 12/2013 |
| WO | 2016/048394 A1 | 3/2016 |

OTHER PUBLICATIONS

Liu, Q. et al., "Hardware-In-The-Loop Simulation for Automated Benchmarking of Cloud Infrastructures", IBM T.J. watson Research Center, Proceedings of the 2012 Winter Simulation Conference 2012, 12 pages.

Open Source Testing, "Performance Testing", available online at < http://www.opensourcetesting.org/category/performance/ >, Dec. 26, 2017, 2 pages.

Hwang et al., "Cloud Performance Modeling with Benchmark Evaluation of Elastic Scaling Strategies", IEEE Transactions on Parallel and Distributed Systems, TPDS-2014-07-0595 R1, Jan. 30, 2015, pp. 1-14.

Dotcom-Monitor Inc., "Scalability Testing and Performance Tools", available online at <https://www.loadview-testing.com/scalability-testing/>, 2017, pp. 1-6.

* cited by examiner

TESTING A CLOUD SERVICE

BACKGROUND

The advent of cloud-based computing architectures has opened new possibilities for businesses. As a result, an increasing number of enterprises are adopting cloud computing based solutions. Generally speaking, cloud computing involves delivery of computing as a service rather than a product, whereby shared resources (software, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service".

There are many models of cloud computing such as Infrastructure-as-a-Service (IaaS), Platform-as-a-Service (PaaS) and Software-as-a-Service (SaaS). Depending on a client's requirement, a cloud service provider may provide either of the aforementioned services, each of which may require provisioning of certain resources on a cloud. For instance, in case of a client request for deployment of an application (for example, an email application) on a cloud, a cloud service provider may provision infrastructure resources (for example, a virtual server) and platform resources in order to deploy the application.

However, this new style of IT has brought in a number of challenges for the development and testing teams. These include compressed release cycles, decreasing time to market, reducing defects in production, shortening software development life cycles, etc. In the context of cloud computing, before a cloud service or application is offered to customers, it may need to be tested for scale and live deployment. In other words, before a cloud service is released, it may be useful to understand how it may be used by customers. Presently available tools typically perform a scaling test by either focusing on creating a particular load for stressing a parameter related to an offering or repeating a particular scenario for a particular time. None of the tools provide a holistic approach to the issue of simulating a field usage pattern in house.

To address these issues, the present disclosure describes various examples for testing a cloud service. In an example, a cloud service or application, which is to be tested, may be deployed in a cloud system. A test load may be applied to the cloud service. Upon application of the test load to the cloud service, it may be determined whether a performance metric related to the cloud service meets a pre-configured criterion. If the performance metric related to the cloud service meets a pre-configured criterion, the cloud service may be scaled according to a scale. The aforesaid operations of applying, determining, and scaling may be iterated until an end condition is met. In an instance, the test load applied to the cloud service may vary after each iteration operation.

The example implementations mentioned herein enable testing of a cloud service or application for scale, and simulate an actual deployment. It may enable scaling-up of various parameters associated with a cloud service during testing, and monitor impact on these parameters if the number of users accessing the cloud service is increased over a period of time.

As used herein, the term "cloud service" may include any resource that is provided over the Internet. Some non-limiting examples of common cloud service resources may include Software as a Service (SaaS), Platform as a Service (PaaS) and Infrastructure as a Service (IaaS).

Figure 1:
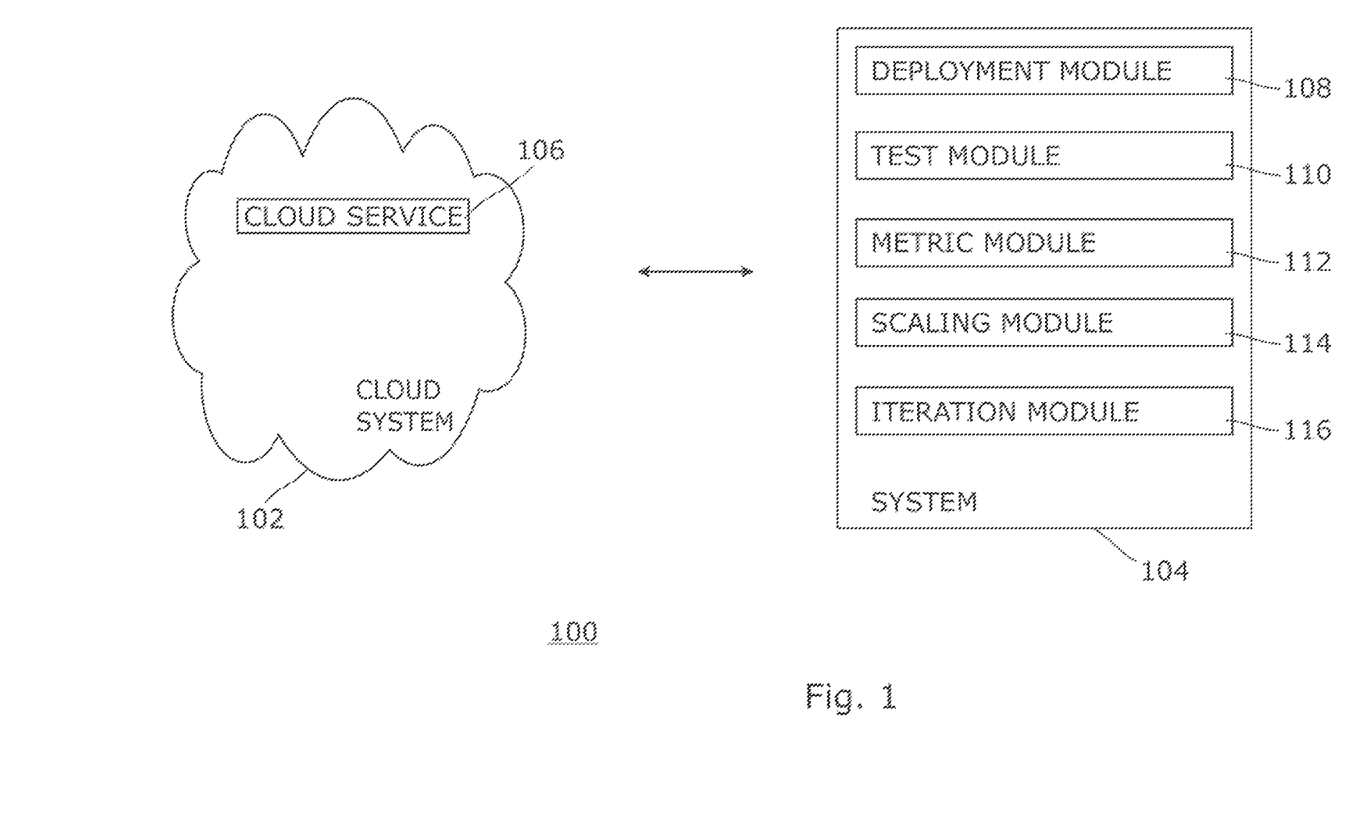
FIG. 1 is a block diagram of an example computing environment for testing a cloud service.

FIG. 1 is a block diagram of an example computing environment 100 for testing a cloud service. Computing environment 100 may include a cloud system (or "cloud") 102 and a computer system 104. In an example, cloud system may be in communication with computer system via a computer network. Computer network may be a wireless or wired network. Computer network may include, for example, a Local Area Network (LAN), a Wireless Local Area Network (WAN), a Metropolitan Area Network (MAN), a Storage Area Network (SAN), a Campus Area Network (CAN), or the like. Further, computer network may be a public network (for example, the Internet) or a private network (for example, an intranet). In another example, computer system may be a part of cloud system. In other words, computer system may be a component of cloud system.

As used herein, the term cloud system (or "cloud") 102 may include a public cloud, a private cloud, a hybrid cloud or a traditional data center offering cloud services. To explain briefly, cloud system 102 may be termed as a public cloud if cloud computing services are rendered over a public network such as the internet. On the other hand, a private cloud is a proprietary network that supplies services to a specific set of users. A hybrid cloud combines private and public cloud services.

Cloud system 102 may offer, provide or deploy various types of cloud services or applications for a user or customer. Referring to FIG. 1, cloud system 102 may deploy a cloud service 106. Although FIG. 1 shows one cloud service 106, other examples may include more than one cloud service. These could include Infrastructure as a Service (IaaS), Platform as a Service (PaaS), Software as a Service (SaaS), and so forth.

Cloud system 102 may include various types of service elements (or computing resources). These computing resources may be hardware resources, software resources, or any combinations thereof. For example, hardware resources may include computer systems, computer servers, workstations, or any other computer devices. And, software resources may include operating system software (machine executable instructions), firmware, and/or application software. Computing resources may also include virtual machines, virtual servers, storage resources, load balancers, firewalls, etc. In an implementation, some or all of the computing resources provided by cloud system 102 may be utilized by a user (customer) of cloud system 102. To provide an example, for deploying a compute infrastructure service, cloud system 102 may provision various computing resources required to deploy the service such as number of CPU cores, amount of memory, size of boot disk, etc.

In an example, cloud system 102 may include a cloud platform. A cloud platform may be used by a user or customer to request a new cloud service and manage an existing cloud service. Users may also use the cloud platform to view status of a pending cloud service request, pending approvals, and approved service subscriptions. Users may also use the cloud platform to request modifications in a cloud service subscription, cancel a cloud service subscription, and perform other actions related to their cloud services. In other words, cloud platform may be used to design, publish, and manage a cloud service.

Computing system 104 may represent any type of computing device capable of reading machine-executable instructions. Examples of computing system 104 may include, without limitation, a server, a desktop computer, a notebook computer, a tablet computer, a thin client, a mobile device, a personal digital assistant (PDA), a phablet, and the like. In the example of FIG. 1, computing system 104 may include a deployment module 108, a test module 110, a metric module 112, a scaling module 114, and an iteration module 116. These modules are described later in this document.

Figure 2:
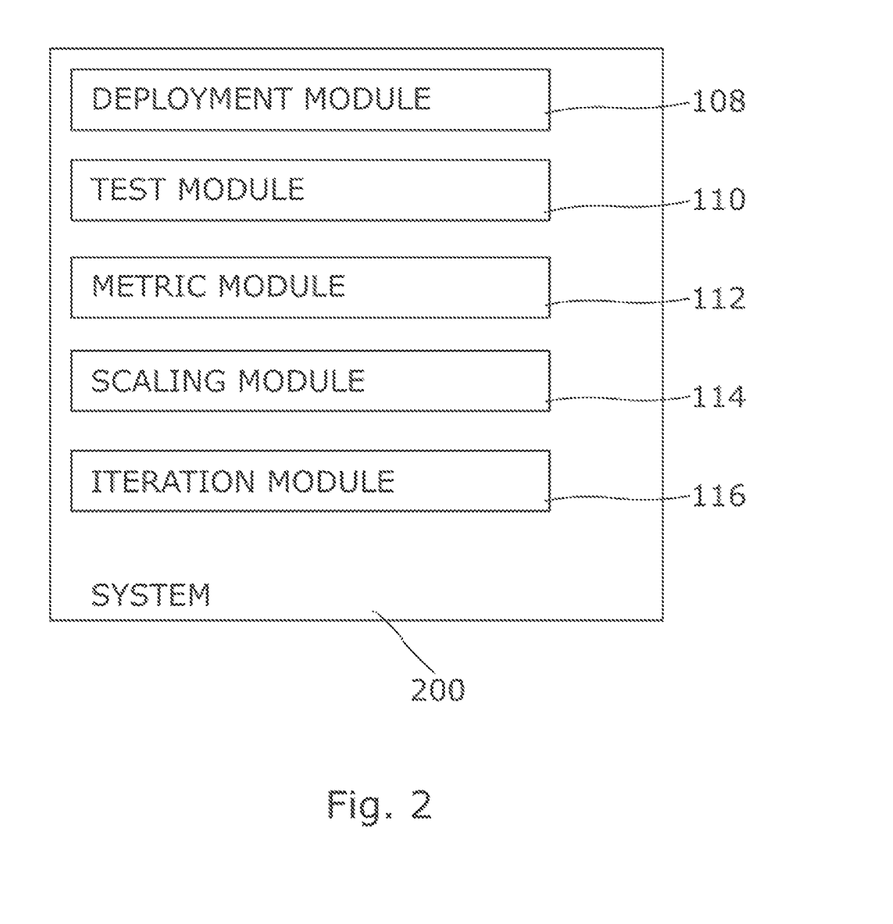
FIG. 2 is a block diagram of an example computer system for testing a cloud service.

FIG. 2 illustrates a system 200 for testing a cloud service, according to an example. In an example, system 200 may be similar to computing system 104 described above. Accordingly, components of system 200 that are similarly named and illustrated in system 104 may be considered similar. In the example of FIG. 2, system 200 may include a deployment module 108, a test module 110, a metric module 112, a scaling module 114, and an iteration module 116. In an example, the aforesaid components of system 200 may be implemented as machine-readable instructions stored on a machine-readable storage medium. The machine-readable storage medium storing such instructions may be integrated with the system 200, or it may be an external medium that may be accessible to the system 200.

The term "module" may refer to a software component (machine executable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computing device.

Deployment module 108 may deploy a cloud service or application (for example 106), which is to be tested, in a cloud system (for example, cloud system 102). The cloud service or application (for example 106), which is to be tested, may be deployed by a cloud service provider that provides the cloud system, or by a user of the cloud system. Deployment module 108 may configure, start, or terminate the cloud service or application (for example 106) to be tested in a cloud system (for example, cloud system 102). In an instance, deployment module 108 may perform the aforementioned operations during testing of the cloud service or application (for example 106) in a cloud system (for example, cloud system 102).

Test module 110 may apply a test load to a cloud service (for example 106), which is to be tested, in a cloud system (for example, cloud system 102). Test module 110 may perform load testing on a cloud service to be tested. Load testing may be defined as the process of putting demand on a system or application and measuring its response. Load testing may be performed to determine a system's behavior under both normal and anticipated peak load conditions. In the present context, load testing may help to identify the maximum operating capacity of a cloud service or application. Thus, as used herein, a "test load" may refer to a factor or parameter used for load testing a cloud service or application. Test loads may comprise various types of tests such as, but not limited to, performance tests, stress tests and configuration tests.

In an example, a "test load" may include the number of users accessing or using a cloud service (for example 106) in a cloud system at a given time. Such users may be termed as "test users". In an example, the test users may be employees or associates of a customer of the cloud system, who may wish to test the cloud service. For instance, such users may belong to a particular department or organization unit of a customer. In such case, test module may configure such users to access or use the cloud service.

In another example, test module may configure an initial set of users to access or use a cloud service (for example 106) under test, and then gradually increase such users according to a pre-defined scale. To provide an example, let's consider a scenario wherein a web application hosted in a cloud system is to be tested for scale. In such case, test module may first configure an initial set of users or tenants (for example, 10 users) to access or use the web application. Subsequently, test module may increase the number of users accessing the web application depending on a pre-configured scale. For example, if a pre-configured scale includes values such as "10", "20", "30", "40" and "50", wherein each value represents the number of users, test module may scale the number of users accessing the web application to another value or level in the scale.

Metric module 112 may determine various performance metrics related to a cloud service (for example 106) under test in a cloud system. Some non-limiting examples of such performance metrics may include CPU utilization, memory utilization, cloud service or application throughput, cloud service or application response time, network resource usage, and storage resource usage. Metric module 112 may determine a performance metric related to a cloud application under test upon application of a test load to a cloud service under test. For instance, metric module 112 may determine performance metric related to a cloud application when a given number of users (i.e. test load) are accessing or using the cloud application.

Metric module 112 may regularly or continuously monitor a performance metric related to a cloud application (for example 106) under test. For instance, metric module 112 may determine a performance metric related to a cloud application (for example 106) under test after each increase in a test load that may be applied to the cloud application. For example, if a test load is the number of users accessing a cloud service at a particular time, metric module 112 may determine a performance metric related to the cloud service each time such users are increased. In an example, a performance metric may comprise a response time metric related to an interface of the cloud service. Such interface may include, for instance, a user interface, an application programming interface, and a command line interface.

Metric module 112 may determine, upon application of a test load to a cloud service (for example 106), whether a performance metric related to a cloud application meets a pre-configured criterion. In an example, such pre-configured criterion may include that a performance metric related to the cloud application under test may not decrease beyond a pre-defined level (for example, in percentage terms) after an increase in a test load applied to the cloud service under test. To provide an illustration, if the value of a performance parameter "M" related to a cloud service under test during test load "A" is "X", then a performance criterion "X−Y<10%" may be defined, wherein "Y" is the value of the performance parameter "M" after test load "B". In such case, the performance metric "M" may be considered to meet the pre-configured criterion, if upon application of the test load "B", "X−Y" is less than 10%. Likewise, other pre-defined criterion (for instance, operation pass related to a cloud service (for example 106) after application of a test load) may be defined. In an instance, metric module may determine whether a performance metric related to a cloud application meets a pre-configured criterion after each increase in a test load applied to a cloud service (for example 106). For example, if a test load is the number of users accessing a cloud service (for example 106) at a particular time, metric module may determine whether a performance metric related to a cloud application meets a pre-configured criterion each time such users are increased. The pre-configured criterion applied to a cloud service (for example 106) may vary after each iteration operation.

Scaling module 114 may scale a cloud service based on a scale if the performance metric meets a pre-configured criterion. In an example, if metric module determines that a performance metric related to a cloud application meets a pre-configured criterion upon application of a test load to the cloud service, scaling module may scale the cloud service to a next (or higher) level according to a pre-defined scale. To provide an illustration, if the test load is the number of users (for example, 10) using a cloud service under test at a given time, and a performance metric related to the cloud service meets a performance criterion in the presence of such number of users (i.e. 10), the scaling module may scale the cloud service under test for use of an increased number of users. Such increase in scale may be up to a next value (example, 20) or a higher value (example, 40) on a pre-defined scale of users. In an example, the pre-defined scale may be changed any time during testing of the cloud service.

Iteration module 116 may iterate operations of test module 110, metric module 112, and scaling module 114 until an end condition is met. In other words, iteration module 116 may apply a test load to a cloud service under test; determine, upon application of the test load to the cloud service, whether a performance metric related to the cloud service meets a pre-configured criterion; and if the performance metric related to the cloud service meets a pre-configured criterion, scale the cloud service until an end condition is met. To provide an illustration, if the test load is the number of users using a cloud service under test at a given time, iteration may keep on applying said test load to a cloud service under test; determine, upon application of the test load to the cloud service, whether a performance metric related to the cloud service meets a pre-configured criterion; and if the performance metric related to the cloud service meets a pre-configured criterion, scale the cloud service until an end condition is met. In an example, a test load applied to the cloud service may vary after each iteration operation.

In the context of the aforementioned example, if the test load is the number of users using a cloud service under test at a given time, then such number of users may vary after each iteration operation.

In an example, an end condition may comprise achieving a final level on a scale used for scaling the cloud service. In the context of the aforementioned example, if the test load is the number of users using a cloud service under test at a given time, then an end condition may be satisfied if the cloud service has been scaled to the maximum number of users on a pre-defined scale.

In another example, an end condition may comprise expiration of a time period. For instance, a time period may be defined from the time of applying a test load to the cloud service under test. Upon expiration of such time period, the iteration process may come to end.

In a yet another example, the end condition may comprise triggering of a monitoring alarm. In an instance, system 200 may include a monitoring module (not shown). Monitoring module may monitor underlying hardware or software resources deploying the cloud service under text. Such monitoring may include, for instance, a database table size check, error logs monitoring, etc. If a pre-defined monitoring test or parameter fails, the monitoring module may trigger an alarm in the system. In such an event, the iteration process may come to end. Once the iteration process comes to an end, logs related to various processes or functions that were performed during the test may be collected, and reports related to the test may be generated.

Figure 3:
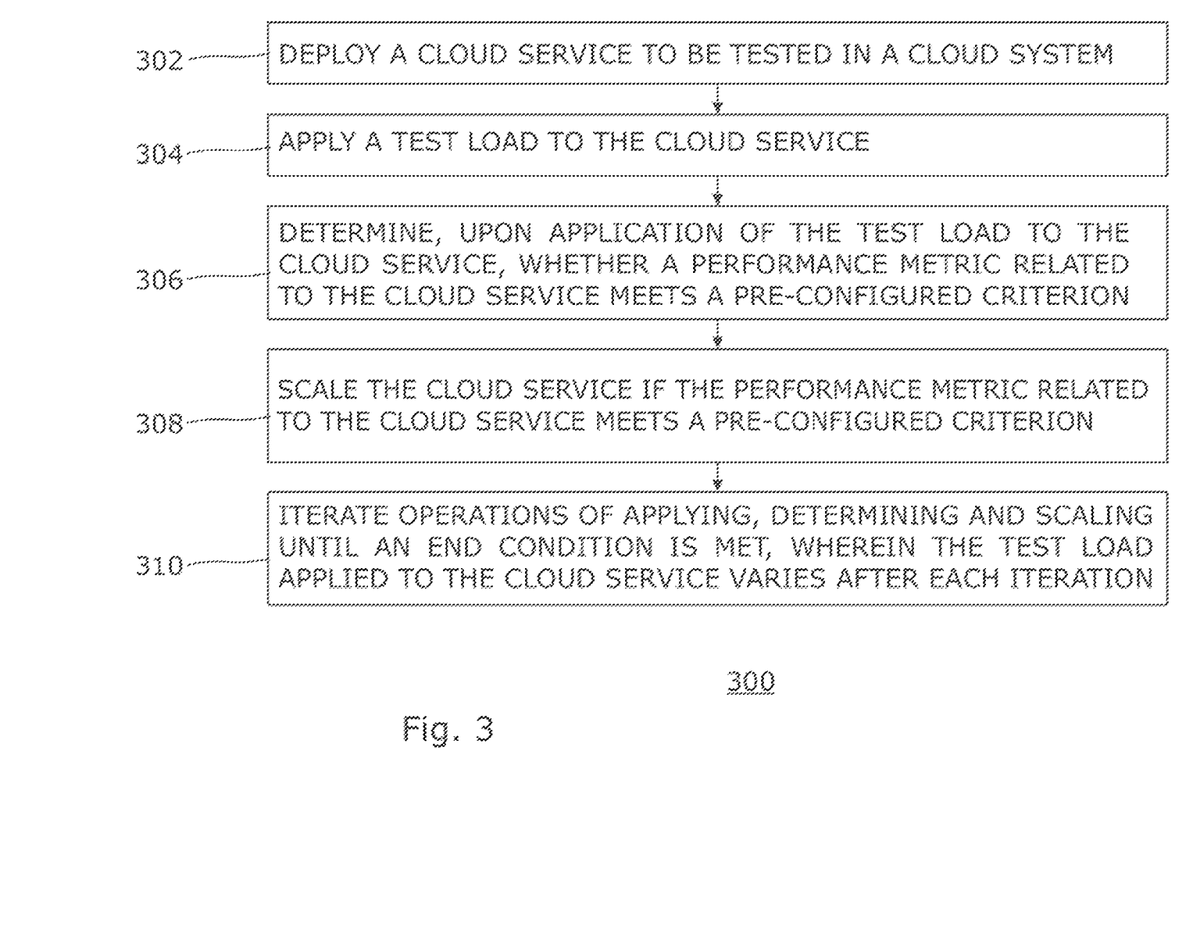
FIG. 3 is a flow chart of an example method for testing a cloud service.

FIG. 3 is a flow chart of an example method 300 for testing a cloud service. The method 300, which is described below, may be executed on a computer system such as computer system 104 of FIG. 1 and computer system 200 of FIG. 2. However, other computing systems may be used as well. At block 202, a cloud service to be tested may be deployed in a cloud system. At block 204, a test load may be applied to the cloud service. At block 206, upon application of the test load to the cloud service, a determination may be made whether a performance metric related to the cloud service meets a pre-configured criterion. At block 208, if it is determined that the performance metric related to the cloud service meets a pre-configured criterion, the cloud service may be scaled. At block 210, aforementioned operations of applying, determining, and scaling may be iterated until an end condition is met. In an instance, the test load applied to the cloud service may vary after each iteration operation.

Figure 4:
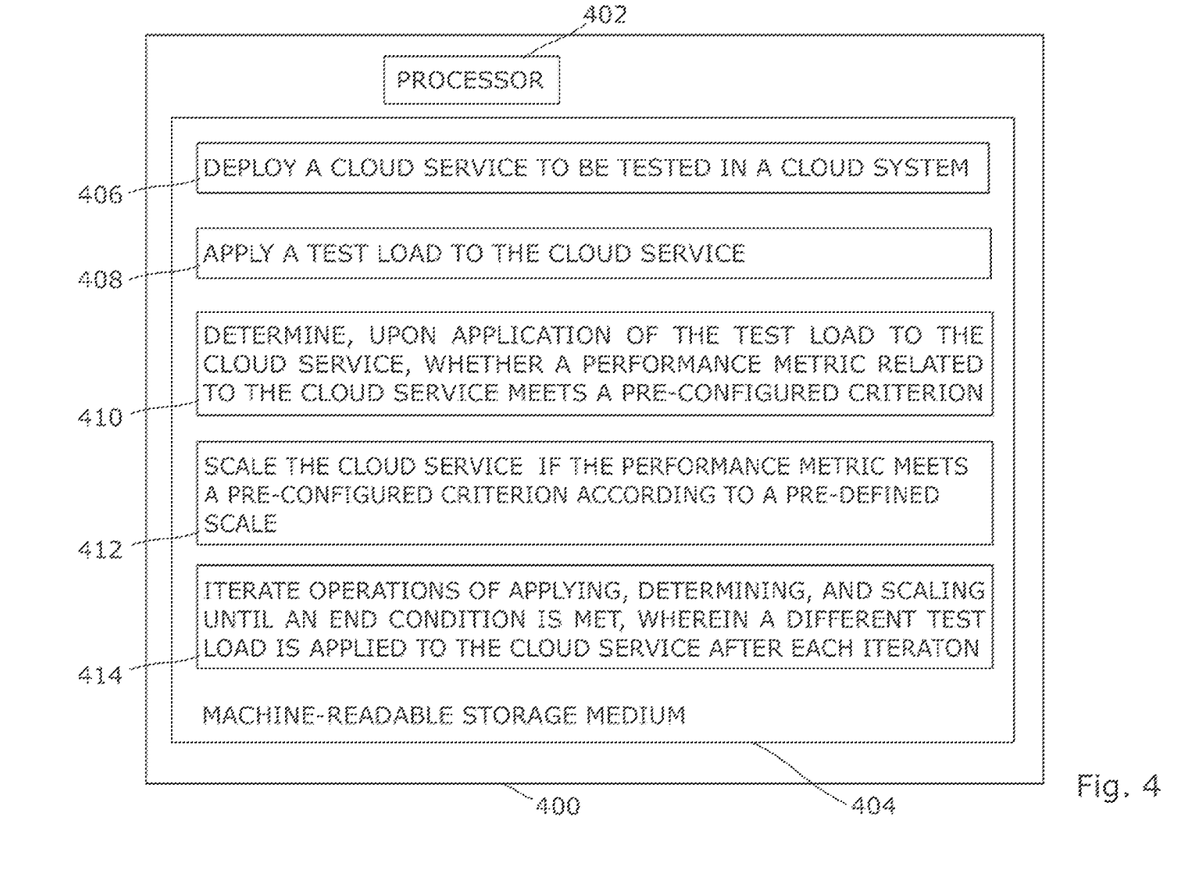
FIG. 4 is a block diagram of an example system for testing a cloud service.

FIG. 4 is a block diagram of an example system 400 for testing a cloud service. System 400 includes a processor 402 and a machine-readable storage medium 404 communicatively coupled through a system bus. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to system 400.

Machine-readable storage medium 404 may store instructions 406, 408, 410, 412, and 414. In an example, instructions 406 may be executed by processor 402 to deploy a cloud service to be tested in a cloud system. Instructions 408 may be executed by processor 402 to apply a test load to the cloud service. Instructions 410 may be executed by processor 402 to determine, upon application of the test load to the cloud service, whether a performance metric related to the cloud service meets a pre-configured criterion. Instructions 410 may be executed by processor 402 to determine scale the cloud service based if the performance metric meets a pre-configured criterion according to a pre-defined scale. Instructions 410 may be executed by processor 402 to determine iterate operations of applying, determining, and scaling until an end condition is met, wherein a different test load is applied to the cloud service after each iteration operation.

For the purpose of simplicity of explanation, the example method of FIG. 3 is shown as executing serially, however it is to be understood and appreciated that the present and other examples are not limited by the illustrated order. The example systems of FIGS. 1, 2 and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method of testing a cloud service, comprising:
deploying a cloud service to be tested in a cloud system;
applying a test load to the cloud service, wherein the test load relates to a number of users accessing the cloud service;
determining, upon application of the test load to the cloud service, whether a performance metric related to the cloud service meets a pre-configured criterion;
if the performance metric related to the cloud service meets the pre-configured criterion, scaling the cloud service by increasing the number of users to a next level on a pre-defined scale; and
iterating the applying, the determining, and the scaling until an end condition is met, wherein the test load applied to the cloud service varies after each iteration, and wherein iterated test loads simulate different field usage patterns.

2. The method of claim 1, wherein the end condition comprises achieving a final level on the pre-defined scale used for scaling the cloud service.

3. The method of claim 1, wherein the end condition comprises expiration of a time period.

4. The method of claim 1, wherein the end condition comprises triggering of a monitoring alarm.

5. The method of claim 1, further comprising monitoring resources deploying the cloud service.

6. The method of claim 5, wherein the monitored resources are underlying hardware resources for deploying the cloud service.

7. The method of claim 6, further comprising triggering a monitoring alarm responsive to a failure of the underlying hardware resources during application of the test load to the cloud service.

8. A system for testing a cloud service, comprising:
a deployment module to deploy a cloud service to be tested in a cloud system;
a test module to apply a test load to the cloud service, wherein the test load relates to a number of users accessing the cloud service;
a metric module to determine, upon application of the test load to the cloud service, whether a performance metric related to the cloud service meets a pre-configured criterion;
a scaling module to scale the cloud service by increasing the number of users to a next level on a pre-defined scale if the performance metric meets the pre-configured criterion; and
an iteration module to iterate operations of applying, determining, and scaling until an end condition is met, wherein the test load applied to the cloud service varies after each iteration, and wherein iterated test loads simulate different field usage patterns.

9. The system of claim 8, wherein the pre-configured criterion varies after each iteration operation.

10. The system of claim 8, wherein the cloud service is a cloud-based application.

11. The system of claim 8, wherein the cloud system is one of a public cloud, a private cloud, and a hybrid cloud.

12. The system of claim 8, wherein to apply the test load to the cloud service comprises configuring a pre-determined number of users to access the cloud service in the cloud system.

13. The system of claim 8, wherein the end condition comprises triggering of a monitoring alarm responsive to a failure of monitored resources for deploying the cloud service.

14. A non-transitory machine-readable storage medium storing instructions for testing a cloud service, the non-transitory machine-readable storage medium comprising:
instructions to deploy a cloud service to be tested in a cloud system;
instructions to apply a test load to the cloud service, wherein the test load relates to a number of users accessing the cloud service;

instructions to determine, upon application of the test load to the cloud service, whether a performance metric related to the cloud service meets a pre-configured criterion;

instructions to scale the cloud service by increasing the number of users to a next level on a pre-defined scale if the performance metric meets the pre-configured criterion; and instructions to iterate the instructions to apply, the instructions to determine, and the instructions to scale until an end condition is met, wherein a different test load is applied to the cloud service after each iteration, and wherein iterated test loads simulate different field usage patterns.

15. The storage medium of claim 14, wherein the performance metric comprises a response time metric related to an interface of the cloud service.

16. The storage medium of claim 15, wherein the interface includes one of a user interface, an application programming interface, and a command line interface.

17. The storage medium of claim 14, wherein the end condition comprises one of achieving a final level on the pre-defined scale, expiration of a time period, and triggering of a monitoring alarm.

18. The storage medium of claim 14, wherein the pre-defined scale is changeable during the iterate operations of applying, determining, and scaling.

19. The storage medium of claim 14, wherein the end condition comprises triggering of a monitoring alarm responsive to a failure of monitored resources for deploying the cloud service.

* * * * *